US012717276B2

(12) United States Patent
Lee et al.

(10) Patent No.: US 12,717,276 B2
(45) Date of Patent: Aug. 25, 2026

(54) APPARATUS FOR MEASURING TEXTURE REALIZATION CHARACTERISTICS OF HOLOGRAPHIC IMAGES

(71) Applicant: Korea Photonics Technology Institute, Gwangju (KR)

(72) Inventors: Kwang Hoon Lee, Anyang-si (KR); Hoe Min Kim, Gwangju (KR); Kyung Il Joo, Naju-si (KR); Min Kyu Park, Gwangju (KR)

(73) Assignee: Korea Photonics Technology Institute, Gwangju (KR)

( * ) Notice: Subject to any disclaimer, the term of this patent is extended or adjusted under 35 U.S.C. 154(b) by 338 days.

(21) Appl. No.: 18/508,393

(22) Filed: Nov. 14, 2023

(65) Prior Publication Data

US 2024/0168434 A1 May 23, 2024

(30) Foreign Application Priority Data

Nov. 22, 2022 (KR) ........................ 10-2022-0156990

(51) Int. Cl.
*G03H 1/22* (2006.01)
*G06V 10/54* (2022.01)
*G06V 10/60* (2022.01)
*G03H 1/02* (2006.01)

(52) U.S. Cl.
CPC ........... *G03H 1/2294* (2013.01); *G06V 10/54* (2022.01); *G06V 10/60* (2022.01); *G03H 2001/0224* (2013.01)

(58) Field of Classification Search
CPC ......... G03H 1/2294; G03H 2001/0224; G06V 10/54; G06V 10/60
See application file for complete search history.

(56) References Cited

U.S. PATENT DOCUMENTS 8,213,008 B2 * 7/2012 Momtahan ............ G01J 3/0208
356/454
8,416,669 B2 * 4/2013 Sato ..................... G03H 1/0443
369/103
2006/0232841 A1 * 10/2006 Toishi .................. G11B 7/0065
2016/0335745 A1 11/2016 Tajima
2018/0341222 A1 11/2018 Nam et al.

FOREIGN PATENT DOCUMENTS

KR 20190026891 A * 3/2019 ........... G02B 27/095
WO 2018014047 A1 1/2018

* cited by examiner

*Primary Examiner* — Terrell M Robinson
(74) *Attorney, Agent, or Firm* — Dinsmore & Shohl LLP; Yongsok Choi, Esq.

(57) ABSTRACT

Disclosed is an apparatus for measuring texture characteristics of a holographic image that is reconstructed optically by a holographic display device. Provided is an apparatus for measuring texture characteristics of a holographic image, which measures texture characteristics of a holographic image that is reconstructed optically by a holographic display device.

6 Claims, 7 Drawing Sheets

APPARATUS FOR MEASURING TEXTURE REALIZATION CHARACTERISTICS OF HOLOGRAPHIC IMAGES

CROSS-REFERENCE TO RELATED APPLICATION

The present application claims priority under 35 U.S.C. § 119 (a) to Korean application number 10-2022-0156990, filed in the Korean Intellectual Property Office on Nov. 22, 2022, the entire disclosure of which is incorporated herein by reference.

This patent is the results of research that was carried out by the support (a unique project number: 1711159702, a detailed project number: 2021-0-00343-002, a project name: Development of digital hologram reconstruction color-space measurement technology) of Institute for Information & communication Technology Planning & evaluation by the finances of the government of the Republic of Korea (Ministry of Science and ICT) in 2023.

BACKGROUND

1. Technical Field

The present disclosure relates to an apparatus for measuring texture characteristics of a holographic image that is reconstructed optically by a holographic display device.

2. Related Art

Contents described in this part merely provide background information of the present embodiment, and do not constitute a conventional technology.

A holographic display method is taken into consideration as a three-dimensional (3-D) image display method of bringing a feeling of depth recognized in the brain to match the focus of an eye and capable of providing full parallax. The following principle is used in the holographic display method. An interference fringe that is obtained by making object light reflected by an original object interfere with reference light is recorded on a hologram pattern. An image of the original object is reconstructed optically when the reference light is diffracted by radiating the reference light to the hologram pattern.

In the holographic display method that is now taken into consideration, a computer generated hologram (CGH) signal is input to a spatial light modulator (SLM) as an electrical signal rather than obtaining a hologram pattern by directly exposing an original object to light. The SLM generates a 3-D image by forming the hologram pattern in response to the input CGH signal and diffracting reference light.

In the holographic display device, texture characteristics of a holographic image that is output by the holographic display device may be different depending on the specifications of components used in the holographic display device. For example, an object to be output may have a smooth surface or may have various surfaces, such as curves or irregularities. If the texture of an object within a holographic image that is output by the holographic display device is not wholly represented, a viewer inevitably feels a sense of difference.

Conventionally, such texture characteristics of a holographic image depend on information that is disclosed by a manufacturer of a holographic display device. However, there is no method of verifying whether texture characteristics of a holographic image are practically matched with information disclosed in a corresponding device by measuring the texture characteristics.

Accordingly, there is a demand for a method of measuring texture characteristics of a holographic image that is output by a holographic display device.

SUMMARY

An embodiment of the present disclosure is directed to providing an apparatus for measuring texture characteristics of a holographic image that is reconstructed optically by a holographic display device.

According to an aspect of the present disclosure, an apparatus for measuring texture characteristics of a holographic image that is output by a holographic display device includes a light-receiving unit configured to receive and sense light that is output by a light source within the holographic display device and that is diffracted by a spatial light modulator (SLM) within the holographic display device, a rotation element having one end fixed to the SLM or having another end fixed to the light-receiving unit within a preset range from the SLM and configured to rotate the light-receiving unit in all directions in which the light-receiving unit is rotatable and to adjust a distance between the light-receiving unit and the SLM, a controller configured to adjust the distance of the rotation element or rotate the rotation element and to determine the texture characteristics of the holographic image that is output by the holographic display device by analyzing sensed sensing values of the light-receiving unit, and a memory unit configured to store original texture characteristics of the holographic image to be output by the holographic display device so that the controller determines the texture characteristics of the holographic image that is output by the holographic display device.

According to an aspect of the present disclosure, the controller determines the texture characteristics of the holographic image that is output by the holographic display device by comparing calculated texture characteristics of the holographic image, which is output by the holographic display device, and the original texture characteristics stored in the memory unit.

According to an aspect of the present disclosure, the controller determines the texture characteristics of the holographic image that is output by the holographic display device at each distance between the light-receiving unit and the SLM.

According to an aspect of the present disclosure, a method of measuring, by an apparatus for measuring texture characteristics of a holographic image, texture characteristics of a holographic image that is output by a holographic display device includes a rotation process of rotating a light-receiving unit within the apparatus for measuring texture characteristics in all directions in which the light-receiving unit is rotatable in a space thereof, an operation process of operating texture characteristics of a holographic image based on sensing values of the light-receiving unit, and a comparison process of comparing original texture characteristics of the holographic image to be output by the holographic display device and texture characteristics operated in the operation process.

According to an aspect of the present disclosure, the operation process includes operating the texture characteristics based on intensities and phases of diffracted light that is received by the light-receiving unit.

According to an aspect of the present disclosure, the method further includes a control process of controlling differences between the original texture characteristics and the operated texture characteristics based on results of the comparison in the comparison process.

According to an aspect of the present disclosure, an apparatus for measuring texture characteristics of a holographic image that is output by a holographic display device includes a light-receiving unit configured to receive and sense light that is output by a light source within the holographic display device and that is diffracted by a spatial light modulator (SLM) within the holographic display device, a rotation element having one end fixed to the SLM or having another end fixed to the light-receiving unit within a preset range from the SLM and configured to rotate the light-receiving unit in all directions in which the light-receiving unit is rotatable and to adjust a distance between the light-receiving unit and the SLM, a controller configured to adjust the distance of the rotation element or rotate the rotation element and to determine a bidirectional reflectance distribution function (BRDF) value or bidirectional scattering distribution function (BSDF) of the holographic image that is output by the holographic display device by analyzing sensed sensing values of the light-receiving unit, and a memory unit configured to store an original BRDF value or BSDF value of the holographic image to be output by the holographic display device so that the controller determines the texture characteristics of the holographic image that is output by the holographic display device.

According to an aspect of the present disclosure, the controller determines the texture characteristics of the holographic image that is output by the holographic display device by comparing a calculated BRDF value or BSDF value of the holographic image, which is output by the holographic display device, and the original BRDF value or BSDF value stored in the memory unit.

According to an aspect of the present disclosure, the controller operates the BRDF value or BSDF value based on intensities and phases of diffracted light that is received by the light-receiving unit.

According to an aspect of the present disclosure, a method of measuring, by an apparatus for measuring texture characteristics of a holographic image, texture characteristics of a holographic image that is output by a holographic display device includes a rotation process of rotating a light-receiving unit within the apparatus for measuring texture characteristics in all directions in which the light-receiving unit is rotatable in a space thereof, an operation process of operating a bidirectional reflectance distribution function (BRDF) value or bidirectional scattering distribution function (BSDF) value of a holographic image based on sensing values of the light-receiving unit, and a comparison process of comparing an original BRDF value or BSDF value of the holographic image to be output by the holographic display device and the BRDF value or BSDF value operated in the operation process.

According to an aspect of the present disclosure, the operation process includes operating the BRDF value or BSDF value based on intensities and phases of diffracted light that is received by the light-receiving unit.

According to an aspect of the present disclosure, the method further includes a control process of controlling the holographic display device so that a difference between the original BRDF value or BSDF value and the operated BRDF value or BSDF value is reduced based on results of the comparison in the comparison process.

According to an aspect of the present disclosure, an apparatus for measuring texture characteristics of a holographic image that is output by a holographic display device includes a light-receiving unit configured to receive and sense light that is output by a light source within the holographic display device and that is diffracted by a spatial light modulator (SLM) within the holographic display device, a rotation element having one end fixed to the SLM or having another end fixed to the light-receiving unit within a preset range from the SLM and configured to rotate the light-receiving unit in all directions in which the light-receiving unit is rotatable and to adjust a distance between the light-receiving unit and the SLM, a diffraction element disposed in front of the light-receiving unit in a direction in which light diffracted by the SLM is incident and configured to diffract the light diffracted by the SLM again, a controller configured to adjust the distance of the rotation element or rotate the rotation element and to determine the texture characteristics of the holographic image that is output by the holographic display device by analyzing sensed sensing values of the light-receiving unit, and a memory unit configured to store original texture characteristics of the holographic image to be output by the holographic display device so that the controller determines the texture characteristics of the holographic image that is output by the holographic display device.

According to an aspect of the present disclosure, the controller determines the texture characteristics of the holographic image that is output by the holographic display device by comparing calculated texture characteristics of the holographic image, which is output by the holographic display device, and the original texture characteristics stored in the memory unit.

According to an aspect of the present disclosure, an apparatus for measuring texture characteristics of a holographic image that is output by a holographic display device includes a light-receiving unit configured to receive and sense light that is output by a light source within the holographic display device and that is diffracted by a spatial light modulator (SLM) within the holographic display device, a diffraction element disposed in front of the light-receiving unit in a direction in which light diffracted by the SLM is incident and configured to diffract the light diffracted by the SLM again, a rotation element having one end fixed to the SLM or having another end fixed to the light-receiving unit within a preset range from the SLM and configured to rotate the light-receiving unit in all directions in which the light-receiving unit is rotatable and to adjust a distance between the light-receiving unit and the SLM, a controller configured to adjust the distance of the rotation element or rotate the rotation element and to determine a bidirectional reflectance distribution function (BRDF) value or bidirectional scattering distribution function (BSDF) of the holographic image that is output by the holographic display device by analyzing sensed sensing values of the light-receiving unit, and a memory unit configured to store an original BRDF value or BSDF value of the holographic image to be output by the holographic display device so that the controller determines the texture characteristics of the holographic image that is output by the holographic display device.

According to an aspect of the present disclosure, the controller operates the BRDF value or BSDF value based on intensities and phases of diffracted light that is received by the light-receiving unit.

As described above, an aspect of the present disclosure has an advantage in that texture characteristics of a holographic image that is reconstructed optically by a holographic display device can be objectively measured.

DETAILED DESCRIPTION

Figure 1:
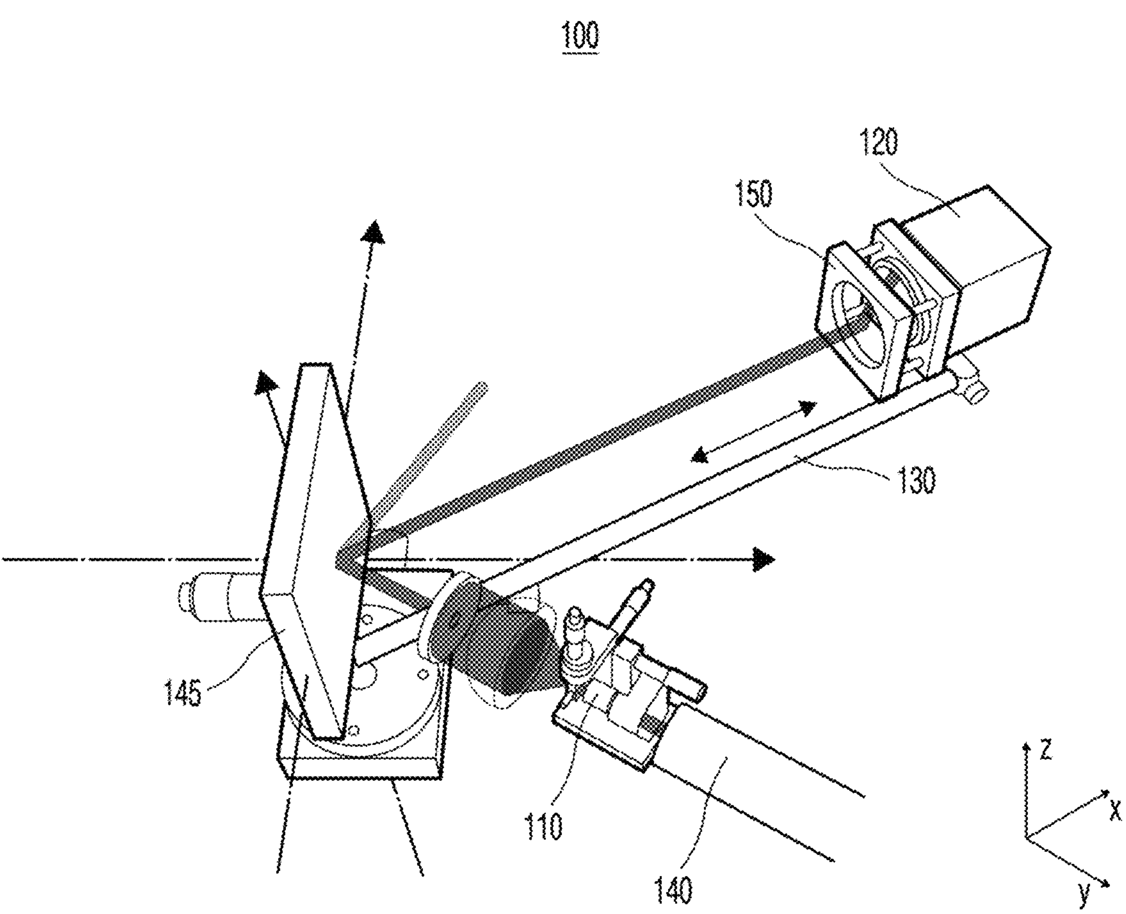
FIGS. 1 and 2 are diagrams illustrating a construction of an apparatus for measuring texture characteristics of a holographic image according to an embodiment of the present disclosure.

The present disclosure may be changed in various ways and may have various embodiments. Specific embodiments are to be illustrated in the drawings and specifically described. It should be understood that the present disclosure is not intended to be limited to the specific embodiments, but includes all of changes, equivalents and/or substitutions included in the spirit and technical range of the present disclosure. Similar reference numerals are used for similar components while each drawing is described.

Terms, such as a first, a second, A, and B, may be used to describe various components, but the components should not be restricted by the terms. The terms are used to only distinguish one component from another component. For example, a first component may be referred to as a second component without departing from the scope of rights of the present disclosure. Likewise, a second component may be referred to as a first component. The term "and/or" includes a combination of a plurality of related and described items or any one of a plurality of related and described items.

When it is described that one component is "connected" or "coupled" to the other component, it should be understood that one component may be directly connected or coupled to the other component, but a third component may exist between the two components. In contrast, when it is described that one component is "directly connected to" or "directly coupled to" the other component, it should be understood that a third component does not exist between the two components.

Terms used in this application are used to only describe specific embodiments and are not intended to restrict the present disclosure. An expression of the singular number includes an expression of the plural number unless clearly defined otherwise in the context. In this specification, a term, such as "include" or "have", is intended to designate the presence of a characteristic, a number, a step, an operation, a component, a part or a combination of them, and should be understood that it does not exclude the existence or possible addition of one or more other characteristics, numbers, steps, operations, components, parts, or combinations of them in advance.

All terms used herein, including technical terms or scientific terms, have the same meanings as those commonly understood by a person having ordinary knowledge in the art to which the present disclosure pertains, unless defined otherwise in the specification.

Terms, such as those defined in commonly used dictionaries, should be construed as having the same meanings as those in the context of a related technology, and are not construed as ideal or excessively formal meanings unless explicitly defined otherwise in the application.

Furthermore, each construction, process, procedure, or method included in each embodiment of the present disclosure may be shared within a range in which the constructions, processes, procedures, or methods do not contradict each other technically.

Figure 2:
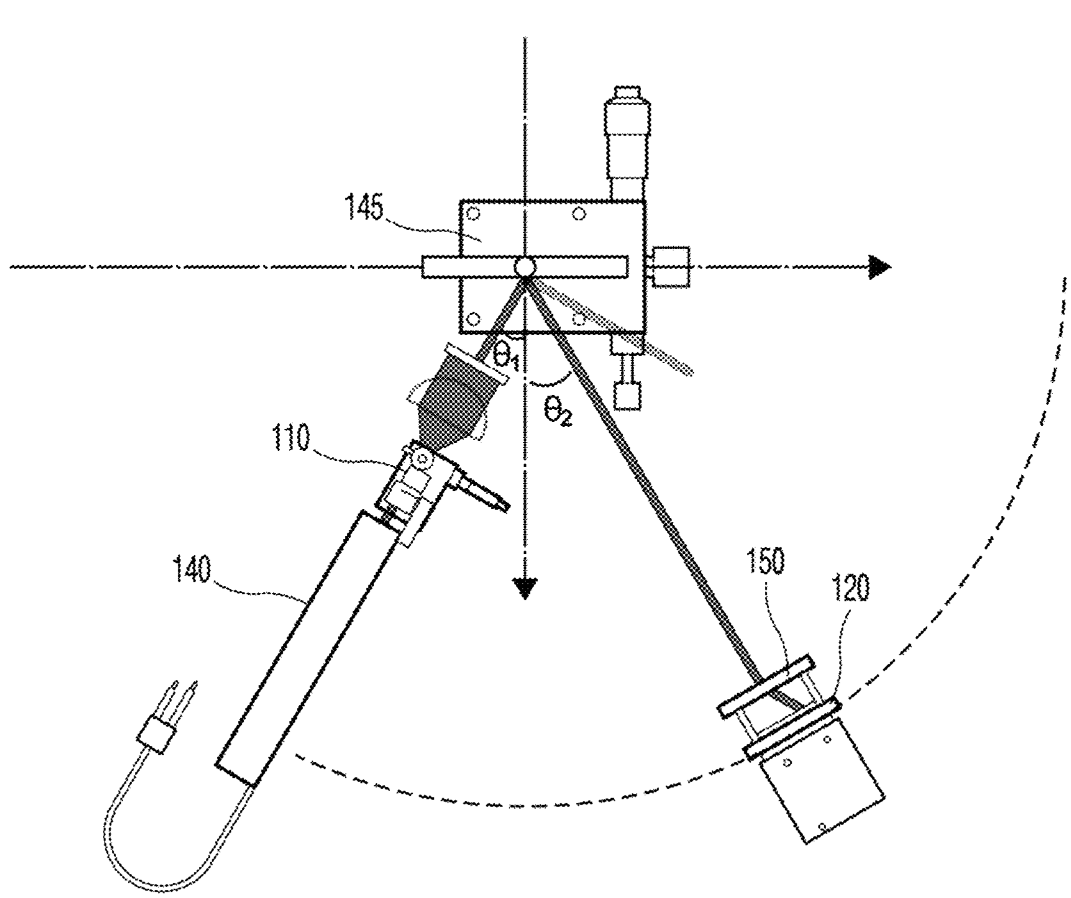

FIGS. 1 and 2 are diagrams illustrating a construction of an apparatus 100 for measuring texture characteristics of a holographic image according to an embodiment of the present disclosure.

Referring to FIGS. 1 and 2, the apparatus 100 for measuring texture characteristics according to an embodiment of the present disclosure includes a beam width adjustment unit 110, a light-receiving unit 120, a rotation element 130, a controller (not illustrated), and a memory unit (not illustrated). The apparatus 100 for measuring texture characteristics may further include a diffraction element 150.

The apparatus 100 for measuring texture characteristics measures whether a holographic display device outputs a holographic image so that the holographic image has specifications (i.e., texture characteristics of a holographic image) that is determined in a corresponding apparatus. More specifically, a light source 140 radiates reference light to a spatial light modulator (SLM) 145, that is, an inspection object. The apparatus 100 for measuring texture characteristics measures texture characteristics of a holographic image that is output therefrom, by receiving and analyzing n-th order diffraction light that is diffracted by the SLM 145.

The beam width adjustment unit 110 adjusts the width of a beam (i.e., reference light) that is radiated by the light source 140. The beam width adjustment unit 110 is disposed in front of the light source 140 on the path of light that is radiated by the light source 140, and adjusts the width of the light radiated by the light source 140. There is a case in which the width (or area) of light to be radiated from the light source 140 to the SLM 145 has to be radiated to the entire part of the SLM 145 and a case in which the width (or area) of light to be radiated from the light source 140 to the SLM 145 has to be radiated to a part of the SLM 145 depending on the type of function to be operated by the controller (not illustrated). The beam width adjustment unit 110 adjusts the width of a beam that is radiated by the light source 140, under the control of the controller (not illustrated).

The light-receiving unit 120 receives and senses light diffracted by the SLM 145. The light-receiving unit 120 is implemented as an element that measures the intensity of light or the intensity and phase of light that is incident thereon, such as a charge-coupled device (CCD) or an optical sensor. The light-receiving unit 120 is fixed to one end of the rotation element 130 and rotated at a location spaced apart from the SLM 145 at a preset distance by the rotation element 130, and measures the intensity of light that is incident thereon.

The rotation element 130 has one end fixed to the light-receiving unit 120 and has the other end fixed to the SLM 145 or a peripheral part thereof, and rotates the light-receiving unit 120. The rotation element 130 rotates the light-receiving unit 120 at a preset angle (e.g., a preset angle within an x-z plane or an x-y plane) from an axis (e.g., an x axis in FIG. 1) in which light diffracted by the SLM 145 travels, or moves the light-receiving unit 120 so that the light-receiving unit 120 becomes distant from or close to the SLM 145 on the corresponding axis. Accordingly, the rotation element 130 enables the light-receiving unit 120 to sense the amount of light received for each angle at a location that is spaced apart from the SLM 145 at a predetermined distance and to sense the amount of light received whenever the distance from the SLM 145 becomes different at the same angle.

The controller (not illustrated) controls the beam width adjustment unit 110 and the rotation element 130 to measure texture characteristics of a holographic image that is output based on a sensing value sensed by the light-receiving unit 120. The measurement of the texture characteristics is performed according to the following process.

Figure 3:
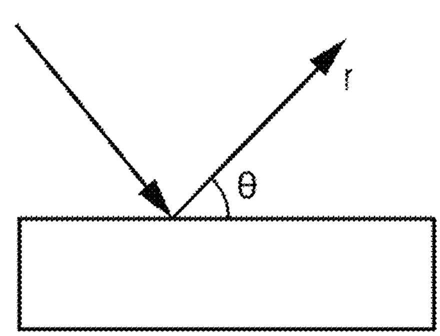
FIGS. 3 to 5 are diagrams illustrating the type of reflected light that is reflected by a surface of an object.
Figure 4:
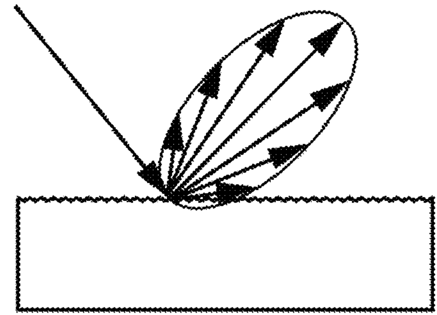
Figure 5:
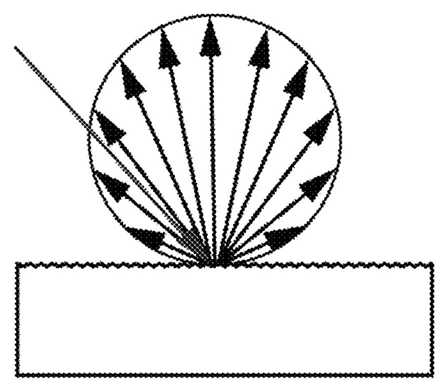

First, the type of reflected light that is reflected by a surface of an object includes cases illustrated in FIGS. 3 to 5 depending on texture of the surface of the object.

Figures 6A, 6B, 6C:
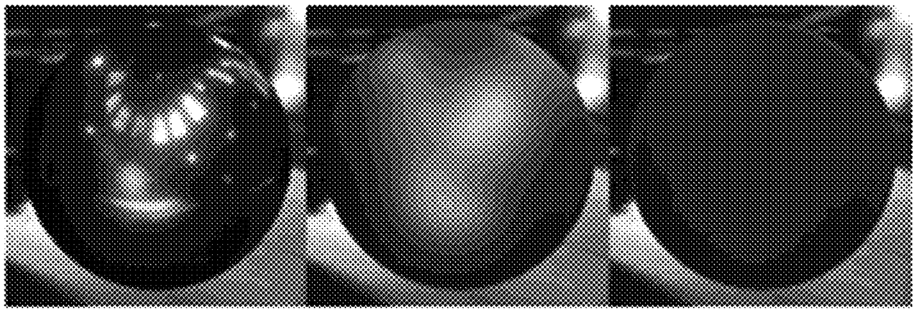
FIGS. 6A to 6C are diagrams illustrating texture characteristics of a holographic image, which are different depending on a surface of an object.

FIGS. 3 to 5 are diagrams illustrating the type of reflected light that is reflected by a surface of an object. FIGS. 6A to 6C are diagrams illustrating texture characteristics of a holographic image, which are different depending on a surface of an object.

If a surface of an object has been smoothly implemented without irregularities or a curve as illustrated in FIG. 6A, as illustrated in FIG. 3, specular reflection occurs in the surface of the object. Most of incident light that is incident on the surface of the object is reflected without any change at a reflection angle having the same size as the incident angle.

If some (e.g., a preset reference value or less) irregularities or curve is present in a surface of an object as illustrated in FIG. 6B, as illustrated in FIG. 4, Gaussian reflection occurs in the surface of the object. Incident light that is incident on the surface of the object is reflected in a Gaussian distribution form on the basis of a reflection angle having the same size as the incident angle.

If irregularities or a curve having a preset reference value or more is present in a surface of an object as illustrated in FIG. 6C, as illustrated in FIG. 5, Lambertian reflection occurs in the surface of the object. In the Lambertian reflection, uniform reflection is performed in all the directions regardless of an incident angle of light.

Reflection occurs in any one form, among the aforementioned cases, or a mixture of the aforementioned cases occurs depending on the texture of a surface of an object.

If a holographic image that represents a specific object wholly has texture characteristics of the specific object, light diffracted by the SLM 145 needs to have reflection characteristics according to the texture characteristics of the specific object.

The controller (not illustrated) controls the rotation element 130 so that the light-receiving unit 120 senses the intensity and phase of light that is diffracted by the SLM 145 while rotating in all the directions (or angles) in which the light-receiving unit 120 is rotatable. The controller (not illustrated) controls the light-receiving unit 120 to rotate on all planes or directions (i.e., the x-y plane and the x-z plane) in which the light-receiving unit 120 is rotatable, at a location spaced apart from the SLM 145 at a preset distance (on the x axis). As the rotation element 130 is rotated, the light-receiving unit 120 may sense the diffracted light as in the graphs illustrated in FIGS. 7 and 8.

Figure 7:
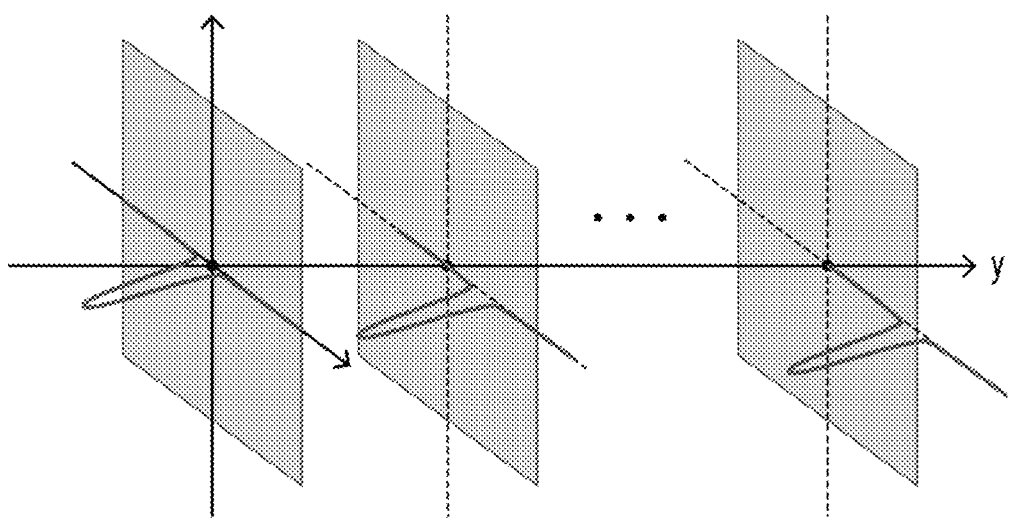
FIGS. 7 to 9 are graphs illustrating the amounts of light received, which are measured by a light-receiving unit based on locations of the light-receiving unit, according to an embodiment of the present disclosure.
Figure 8:
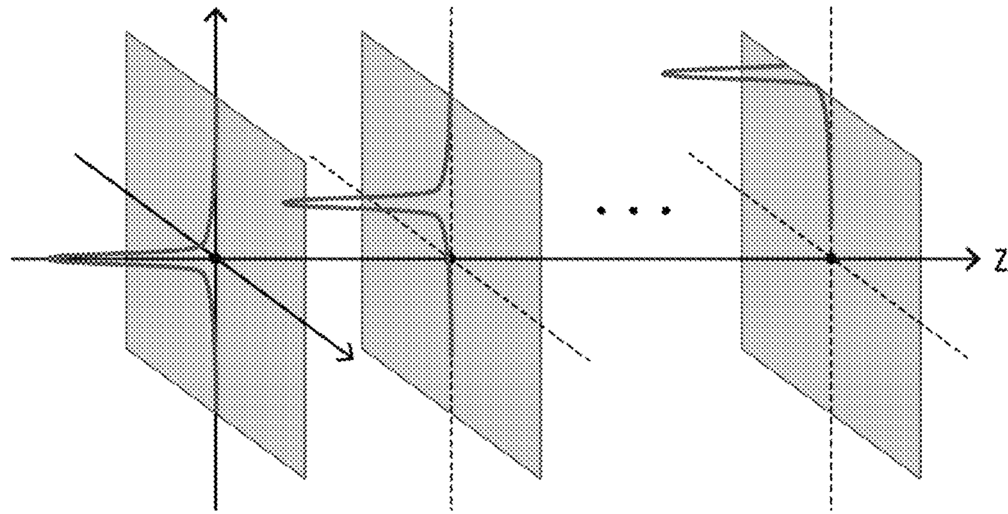

FIGS. 7 and 8 are graphs illustrating the amounts of light received, which are measured by the light-receiving unit at locations of the light-receiving unit, according to an embodiment of the present disclosure.

As illustrated in FIGS. 7 and 8, the controller (not illustrated) controls the rotation element 130 to rotate in a direction perpendicular to a direction in which the diffracted light travels so that the light-receiving unit 120 rotates in all the directions in which the light-receiving unit 120 is rotatable.

Referring back to FIGS. 1 and 2, the controller (not illustrated) analyzes texture characteristics of a holographic image based on sensing values sensed by the light-receiving unit 120 while the light-receiving unit 120 rotates in all the directions in which the light-receiving unit 120 is rotatable. A function that is obtained by objectifying the texture characteristics of the holographic image includes a bidirectional reflectance distribution function (BRDF) and a bidirectional scattering distribution function (BSDF). The BRDF is a function having the assumption that light incident on the light-receiving unit 120 disposed in a specific direction includes only light that is radiated in the specific direction from the light source, and is operated by using the intensity and phase of diffracted light sensed by the light-receiving unit 120. The BSDF is a function having the assumption that only light that is scattered after light having a narrow band width is radiated to a surface of an object is present. Likewise, the BSDF is operated by using the intensity and phase of diffracted light sensed by the light-receiving unit 120.

In order to measure a BRDF value of a holographic image, the controller (not illustrated) controls the beam width adjustment unit 110 so that the width (or area) of light to be radiated to the SLM 145 covers the entire part of the SLM 145. After controlling the beam width adjustment unit 110, the controller (not illustrated) operates the BRDF value based on all sensing values (i.e., the intensities and phases of diffracted light) sensed by the light-receiving unit 120 while the light-receiving unit 120 rotates.

In order to measure a BSDF value of the holographic image, the controller (not illustrated) controls the beam width adjustment unit 110 so that the width (or area) of light to be radiated to the SLM 145 covers a part of the SLM 145. After controlling the beam width adjustment unit 110, the controller (not illustrated) operates the BSDF value based on all sensing values (i.e., the intensities and phases of diffracted light) sensed by the light-receiving unit 120 while the light-receiving unit 120 rotates.

The controller (not illustrated) compares an original BRDF value and original BSDF value of an object that is represented by a holographic image to be output by the SLM 150 and the operated BRDF value and BSDF value, respectively. As the operated BRDF value and BSDF value become closer to the original BRDF value and original BSDF value, a viewer may feel a more sense of reality (i.e., feels the texture of the object more realistically) in the output holographic image.

When the original BRDF value and original BSDF value and the operated BRDF value and BSDF value have differences, respectively, the controller (not illustrated) adjusts the light source 140 or the SLM 145 in a direction in which the differences are reduced. The viewer may feel a greater sense of reality according to texture characteristics only when the BRDF value and BSDF value of the light diffracted by the SLM 145 become close to the original BRDF value and the original BSDF value, respectively, as much as possible. Accordingly, the controller (not illustrated) adjusts the light source 140 or the SLM 145 so that the intensity or phase of the light diffracted by the SLM 145 is changed and becomes close to the original BRDF value and original BSDF value. The controller (not illustrated) may directly adjust the intensity or phase of light to be radiated by controlling the light source 140, and may indirectly adjust a diffraction angle of diffracted light by controlling the light source 140 or the SLM 145. In particular, the diffraction angle of the diffracted light is operated as follows.

$$n_2\sin\theta_2 = n_1\sin\theta_1 + \frac{m\lambda}{\Lambda}$$

Wherein, $n_1$ and $n_2$ mean refractive indices of a medium through which the incident light and the diffracted light go. $\theta_1$ means an incident angle. $\theta_2$ means the diffraction angle. m means the order of the diffracted light. $\lambda$ means the wavelength of light used. $\Lambda$ means a spatial frequency within the SLM.

The controller (not illustrated) adjusts the diffraction angle of the diffracted light by adjusting the wavelength of the light or the spatial frequency of the SLM because n-th order diffraction light diffracted by the SLM 145 has an operated diffraction angle. The controller (not illustrated) can reduce the differences between the original BRDF value and BSDF value and the operated BRDF value and BSDF value, respectively, based on the adjustment.

Texture that is felt by a viewer with respect to a specific object may be different depending on a distance from the object. Although an object has the same texture, texture that is felt by a viewer with respect to the object is different depending on a distance where the viewer watches the object. This is illustrated in FIG. 9.

Figure 9:
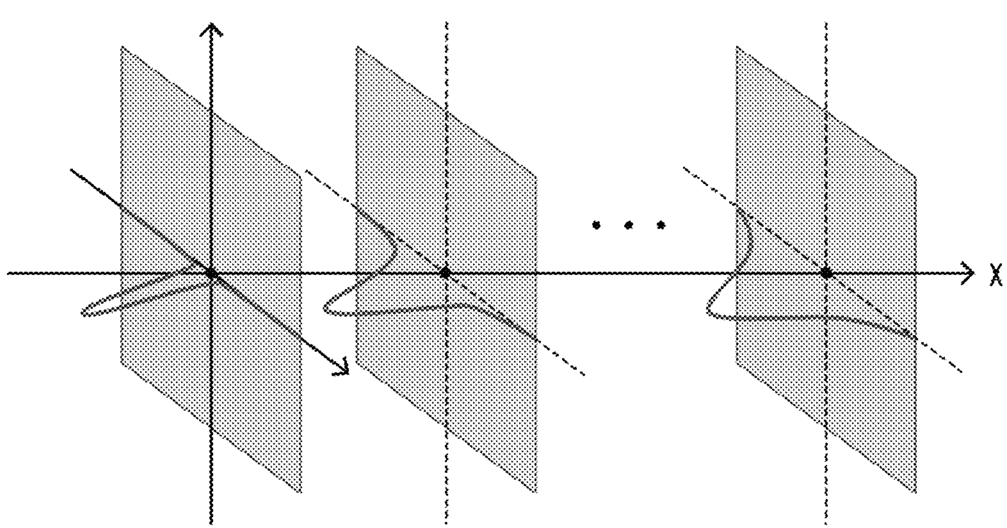

FIG. 9 is a graph illustrating the amounts of light received, which are measured by the light-receiving unit at locations of the light-receiving unit according to an embodiment of the present disclosure.

Referring to FIG. 9, although the light-receiving unit 120 senses diffracted light in the same direction, the size of the sensed diffracted light is different depending on a distance from the light-receiving unit 120. Accordingly, texture of a holographic image, which is recognized by a viewer, may be different depending on the distance.

The controller (not illustrated) analyzes texture characteristics of a holographic image through the aforementioned process at each distance with reference to the fact that the texture of the holographic image may be different depending on the distance. The controller (not illustrated) may also analyze to which distance the holographic image of a holographic display device can wholly represent the texture characteristics of the holographic image, based on the analyzed texture characteristics.

The apparatus 100 for measuring texture characteristics may further include the diffraction element 150. The diffraction element 150 is disposed in front of the light-receiving unit 120 in the direction in which light diffracted by the SLM 145 travels to the light-receiving unit 120, and diffracts the light, which has been diffracted by the SLM 145, again. The diffraction element 150 is implemented by using an SLM having the same modulation fringe as the SLM 145 or (analog) diffraction grating having the same modulation fringe as the SLM 145. The diffraction element 150 is disposed in front of the light-receiving unit 120 on the path of light that is diffracted by the SLM 145 and that is incident on the light-receiving unit 120, and additionally diffracts the light diffracted by the SLM 145.

Theoretically, the intensity of diffracted light sensed by the light-receiving unit 120 has clear Gaussian distributions as illustrated in FIGS. 7 to 9. Accordingly, it may be clearly seen that light having the strongest intensity has been incident in a specific direction. However, there is a case in which the beam width of light radiated by the light source 140 has a very small value. Accordingly, although it may be recognized that light has been incident within a predetermined angle range, it may be difficult to recognize that the greatest (diffraction) light has been incident at a specific angle with clear resolution as in the theoretical case.

In order to solve such a problem, the diffraction element 150 is disposed in front of the light-receiving unit 120 in the direction in which light is incident on the light-receiving unit 120. As described above, the diffraction element 150 diffracts diffracted light, which is incident on the light-receiving unit 120, again. Light that is incident on the diffraction element 150 is diffracted by the diffraction element 150 at an $\alpha$ angle again, and is incident on the light-receiving unit 120. If diffracted light travels to a width or area A via the SLM 145 in the state in which a separate diffraction element 150 has not been disposed, the diffracted light is incident on the light-receiving unit 120 by the width or area A. In contrast, if the diffraction element 150 is disposed, the width or area to which the diffracted light travels is increased to a width or area "A/cos $\alpha$" in the light-receiving unit 120. The diffracted light that is incident on the light-receiving unit 120 (i.e., diffracted by the diffraction element) may be expanded at a considerable ratio depending on an angle at which the diffracted light is diffracted by the diffraction element 150. Accordingly, the controller (not illustrated) can sense the diffraction angle by checking a maximum point of a sensing value more smoothly. Accordingly, the diffraction element 150 may be additionally disposed at the aforementioned location.

The memory unit (not illustrated) stores an original BRDF value and BSDF value (i.e., texture characteristics) of an object that is represented by a holographic image to be output by the SLM 150. The memory unit (not illustrated) stores the original BRDF value and the original BSDF value so that the controller (not illustrated) can analyze texture characteristics of the holographic image.

Figure 10:
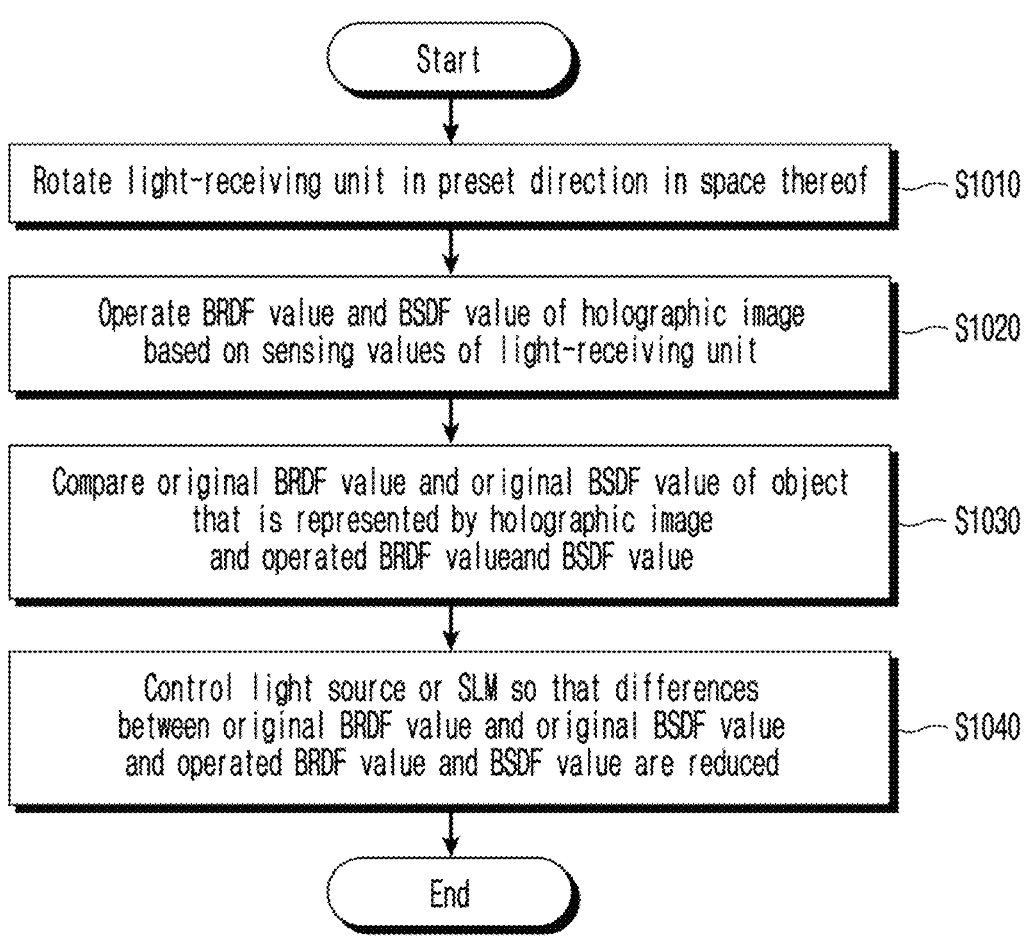
FIG. 10 is a flowchart illustrating a method of measuring, by the apparatus for measuring texture characteristics, texture characteristics of a holographic image and reducing a difference between measured characteristics and characteristics of an original target according to an embodiment of the present disclosure correct.

FIG. 10 is a flowchart illustrating a method of measuring, by the apparatus for measuring texture characteristics, texture characteristics of a holographic image and reducing a difference between measured characteristics and characteristics of an original target according to an embodiment of the present disclosure correct.

The controller (not illustrated) rotates the light-receiving unit 120 in a preset direction in a space thereof (S1010). The controller (not illustrated) controls the rotation element 130 so that the light-receiving unit 120 rotates in all directions in which the light-receiving unit 120 is rotatable, at a location spaced apart from the SLM 145 at a preset distance.

The controller (not illustrated) operates a BRDF value and BSDF value of a holographic image based on sensing values of the light-receiving unit 120 (S1020).

The controller (not illustrated) compares an original BRDF value and original BSDF value of an object that is represented by the holographic image and the operated BRDF value and BSDF value, respectively (S1030).

The controller (not illustrated) controls the light source 140 or the SLM 145 so that differences between the original BRDF value and original BSDF value and the operated BRDF value and BSDF value, respectively, are reduced (S1040). As the differences between the original BRDF value and original BSDF value and the operated BRDF value and BSDF value are reduced, the controller (not illustrated) may directly adjust the intensity or phase of light to be radiated by controlling the light source 140, and may indirectly adjust a diffraction angle of diffracted light by controlling the light source 140 or the SLM 145.

The processes in FIG. 10 have been described as being sequentially executed, but merely illustrates the technology spirit of an embodiment of the present disclosure. In other words, a person having ordinary knowledge in the art to which an embodiment of the present disclosure pertains may variously modify and change the processes by changing and executing the sequence described in FIG. 10 or executing one or more of the processes in parallel within a range that does not deviate from the intrinsic characteristic of an embodiment of the present disclosure. Accordingly, FIG. 10 is not limited to a time-series sequence.

The processes illustrated in FIG. 10 may be implemented in a computer-readable recording medium in the form of a computer-readable code. The computer-readable recording medium includes all types of recording devices in which data readable by a computer system is stored. That is, the computer-readable recording medium includes storage media, such as magnetic storage media (e.g., ROM, a floppy disk, and a hard disk) and optical reading media (e.g., CD-ROM and a DVD). Furthermore, the computer-readable recording medium may be distributed to computer systems connected over a network, and the computer-readable code may be stored and executed in a distributed manner.

The above description is merely a description of the technical spirit of the present embodiment, and those skilled in the art may change and modify the present embodiment in various ways without departing from the essential characteristic of the present embodiment. Accordingly, the embodiments should not be construed as limiting the technical spirit of the present embodiment, but should be construed as describing the technical spirit of the present embodiment. The technical spirit of the present embodiment is not restricted by the embodiments. The range of protection of the present embodiment should be construed based on the following claims, and all of technical spirits within an equivalent range of the present embodiment should be construed as being included in the scope of rights of the present embodiment.

What is claimed is:

1. An apparatus for measuring texture characteristics of a holographic image that is output by a holographic display device, the apparatus comprising:

a light-receiving unit configured to receive and sense light that is output by a light source within the holographic display device and that is diffracted by a spatial light modulator (SLM) within the holographic display device;

a diffraction element disposed in front of the light-receiving unit in a direction in which light diffracted from the SLM is incident and configured to diffract the light diffracted from the SLM again;

a rotation element having one end fixed to the SLM or having another end fixed to the light-receiving unit within a preset range from the SLM and configured to rotate the light-receiving unit in all directions in which the light-receiving unit is rotatable and to adjust a distance between the light-receiving unit and the SLM;

a controller configured to adjust the distance of the rotation element or rotate the rotation element and to determine the texture characteristics of the holographic image that is output by the holographic display device by analyzing sensed sensing values of the light-receiving unit; and a memory unit configured to store original texture characteristics of the holographic image to be output by the holographic display device so that the controller determines the texture characteristics of the holographic image that is output by the holographic display device.

2. The apparatus of claim 1, wherein the controller determines the texture characteristics of the holographic image that is output by the holographic display device by comparing calculated texture characteristics of the holographic image, which is output by the holographic display device, and the original texture characteristics stored in the memory unit.

3. The apparatus of claim 1, wherein the controller determines the texture characteristics of the holographic image that is output by the holographic display device at each distance between the light-receiving unit and the SLM.

4. An apparatus for measuring texture characteristics of a holographic image that is output by a holographic display device, the apparatus comprising:

a light-receiving unit configured to receive and sense light that is output by a light source within the holographic display device and that is diffracted by a spatial light modulator (SLM) within the holographic display device;

a diffraction element disposed in front of the light-receiving unit in a direction in which light diffracted from the SLM is incident and configured to diffract the light diffracted from the SLM again;

a rotation element having one end fixed to the SLM or having another end fixed to the light-receiving unit within a preset range from the SLM and configured to rotate the light-receiving unit in all directions in which the light-receiving unit is rotatable and to adjust a distance between the light-receiving unit and the SLM;

a controller configured to adjust the distance of the rotation element or rotate the rotation element and to determine a bidirectional reflectance distribution function (BRDF) value or bidirectional scattering distribution function (BSDF) of the holographic image that is output by the holographic display device by analyzing sensed sensing values of the light-receiving unit; and a memory unit configured to store an original BRDF value or BSDF value of the holographic image to be output by the holographic display device so that the controller determines the texture characteristics of the holographic image that is output by the holographic display device.

5. The apparatus of claim 4, wherein the controller determines the texture characteristics of the holographic image that is output by the holographic display device by comparing a calculated BRDF value or BSDF value of the holographic image, which is output by the holographic display device, and the original BRDF value or BSDF value stored in the memory unit.

6. The apparatus of claim 4, wherein the controller operates the BRDF value or BSDF value based on intensities and phases of diffracted light that is received by the light-receiving unit.

* * * * *